(12) United States Patent
Liu et al.

(10) Patent No.: US 7,933,058 B2
(45) Date of Patent: Apr. 26, 2011

(54) THERMOCHROMIC COMPONENT AND THERMOCHROMIC DISPLAY APPARATUS USING THE SAME

(75) Inventors: Peng Liu, Beijing (CN); Duan-Liang Zhou, Beijing (CN); Liang Liu, Beijing (CN); Kai-LI Jiang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/589,478

(22) Filed: Oct. 22, 2009

(65) Prior Publication Data

US 2010/0220379 A1 Sep. 2, 2010

(30) Foreign Application Priority Data

Feb. 27, 2009 (CN) .......................... 2009 1 0105810

(51) Int. Cl.
 *G02F 1/01* (2006.01)
 *G02F 1/15* (2006.01)
 *G02F 1/00* (2006.01)

(52) U.S. Cl. .......................... 359/288; 359/265; 359/321
(58) Field of Classification Search .................. 359/288, 359/265–277, 245, 247, 254, 242, 240, 250, 359/253, 315, 318, 321; 345/49, 105; 348/817; 250/70; 438/929
See application file for complete search history.

(56) References Cited

U.S. PATENT DOCUMENTS

| | | | |
|---|---|---|---|
| 5,202,677 A | 4/1993 | Parker et al. | |
| 7,045,108 B2 | 5/2006 | Jiang et al. | |
| 2005/0236948 A1* | 10/2005 | Hayashi et al. | 313/46 |
| 2007/0166223 A1 | 7/2007 | Jiang et al. | |
| 2008/0170982 A1 | 7/2008 | Zhang et al. | |
| 2008/0297878 A1* | 12/2008 | Brown et al. | 359/263 |
| 2008/0299031 A1 | 12/2008 | Liu et al. | |

* cited by examiner

*Primary Examiner* — Ricky L Mack
*Assistant Examiner* — Dawayne A Pinkney
(74) *Attorney, Agent, or Firm* — D. Austin Bonderer (57) ABSTRACT

A thermochromic component includes a thermochromic module and a heater. The heater is thermally coupled with the thermochromic module. The heater includes a carbon nanotube structure. The carbon nanotube structure directly transfers heat to the thermochromic module. A thermochromic display apparatus also is provided. The thermochromic display apparatus uses the thermochromic component.

20 Claims, 11 Drawing Sheets

THERMOCHROMIC COMPONENT AND THERMOCHROMIC DISPLAY APPARATUS USING THE SAME

BACKGROUND

1. Technical Field

The present disclosure relates to thermochromic components, especially to a thermochromic component based on carbon nanotubes and a thermochromic display apparatus using the same.

2. Description of the Related Art

Thermochromic materials are materials that can change their color in response to changes in temperature. Thermochromic materials can be used to make a thermochromic display apparatus.

Figure 11:
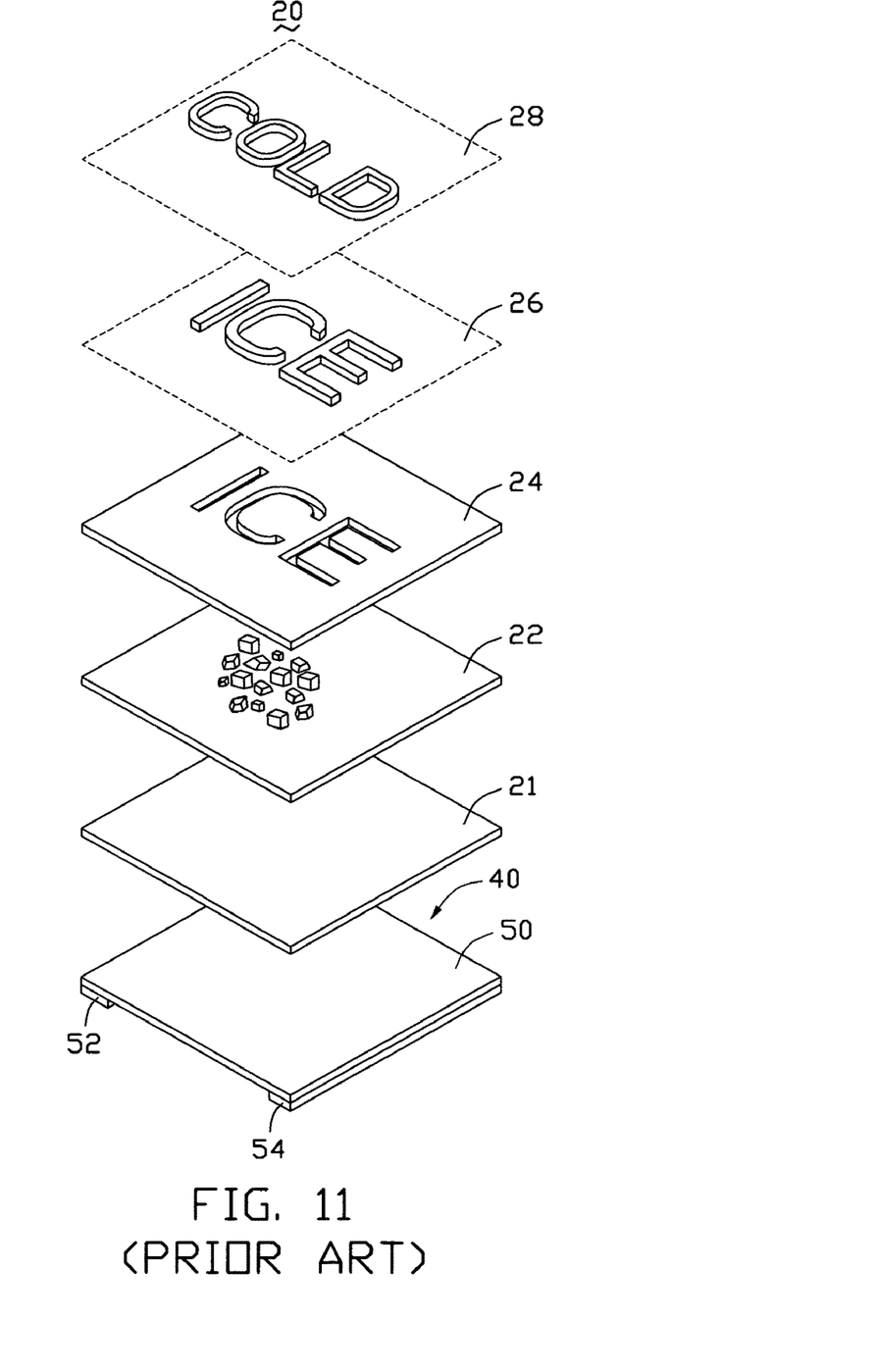
FIG. 11 is a schematic, exploded view of a typical thermochromic display apparatus according to the prior art.

A typical example is shown and discussed in U.S. Pat. No. 5,202,667, entitled "DISPLAY APPARATUS USING THERMOCHROMIC MATERIAL", issued to Robert Parker, et al. on Apr. 13, 1993. This patent discloses a thermochromic display apparatus 20. Referring to FIG. 11, the thermochromic display apparatus 20 includes a supporting substrate 21, a heater 40, a non-thermochromic image layer 22, and thermochromic image layers 24, 26, 28. The non-thermochromic image layer 22 and the thermochromic image layers 24, 26, 28 are stacked on the supporting substrate 21 in order. The heater 40 is disposed on the supporting substrate 21 opposite to the non-thermochromic image layer 22 and the thermochromic image layers 24, 26, 28. The heater 40 includes a thin conductive film 50 of stainless steel which has been vapor deposited on the supporting substrate 21 and a pair of opposed, cooper buss bars 52 and 54 which have been vapor deposited onto the film 50 on the supporting substrate 21. The heater 40 is a vapor deposited conductive film made of stainless steel. Due to the constant resistance of the heater 40, the heater 40 is a good heat source.

However, because the stainless steel is directly deposited on the supporting substrate 21 to form the heater 40, the supporting substrate 21 will absorb a portion of heat generated by the heater 40, thereby decreasing efficiency of the electricity-heat conversion of the thermochromic display apparatus 20. Therefore, the thermochromic display apparatus 20 has poor display response and wastes power.

What is needed, therefore, is a thermochromic component and a thermochromic display apparatus having the same, which can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
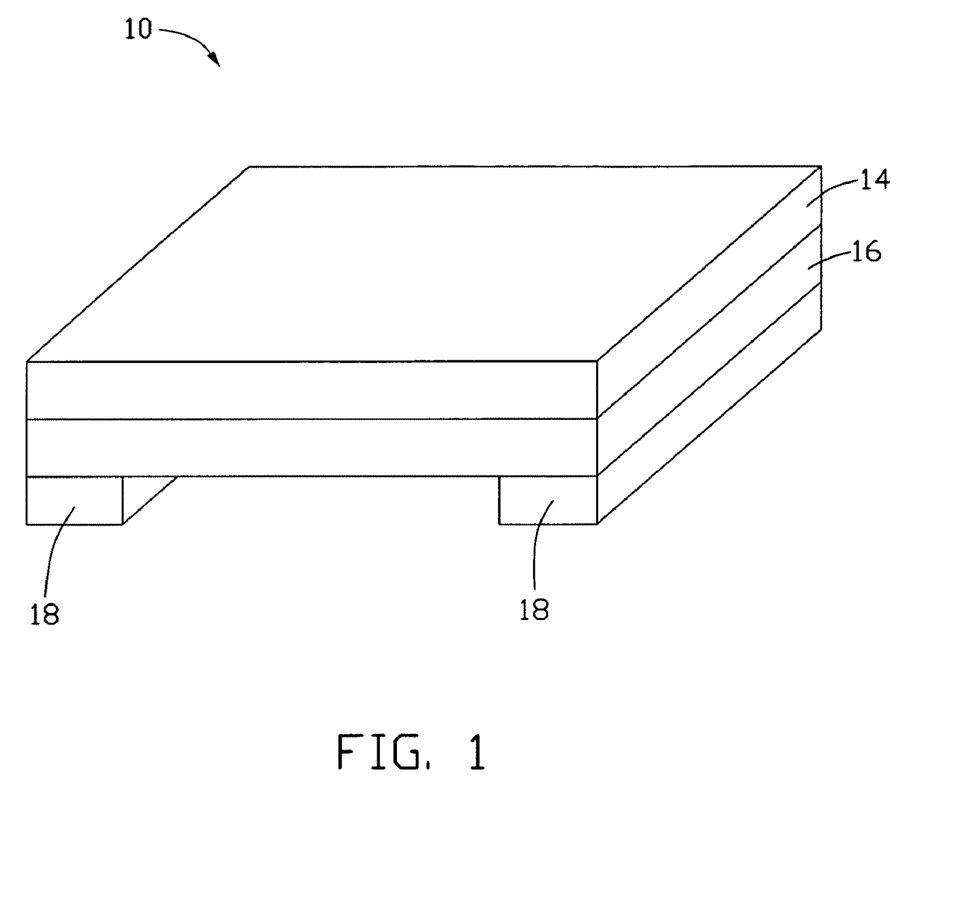
FIG. 1 is a schematic view of a thermochromic component in accordance with an embodiment.

Referring to FIG. 1, an embodiment of a thermochromic component 10 includes a thermochromic module 14, a heater 16, and at least two electrodes 18. The thermochromic module 14 is thermally coupled to the heater 16. The at least two electrodes 18 are electrically connected to the heater 16 and spaced apart from each other.

The thermochromic module 14 can reversibly change colors under changing temperature conditions. The color of the thermochromic module 14 can be changed by controlling the temperature of the thermochromic module 14. The thermochromic module 14 is made of thermochromic material. Thermochromic material includes single-colored thermochromic materials and/or multi-colored thermochromic materials. In one embodiment, the thermochromic module 14 is made of thermochromic liquid crystal material.

The heater 16 is configured to heat the thermochromic module 14 to cause a color change. The thermochromic 14 can be adjacent to the heater 16. For example, the thermochromic module 14 may be direct contact with or may be spaced apart from or may use a conductive adhesive contact with the heater 16. In one embodiment, the thermochromic module 14 is mounted on a surface of the heater 16 to direct contact with the heater 16 via a process of printing, coating, spraying, or the like. The heater 16 includes at least one carbon nanotube structure. The carbon nanotube structure may include at least one carbon nanotube film and/or a number of carbon nanotube wires. The use of all of the following described carbon nanotube films and carbon nanotube wires is envisioned to be used with the embodiments of the thermochromatic components and/or thermochromatic display apparatuses. Since the thickness of the carbon nanotube structure is small, such as less than 10 microns ($\mu$m), the carbon nanotube structure is transparent. There is no particular restriction on the thickness of the carbon nanotube structure and it may be appropriately selected depending on the purpose, and can be, for example, greater than 0.5 nanometers (nm), and more specifically about 0.5 $\mu$m to 200 $\mu$m.

The carbon nanotube structure can include one or more layers of carbon nanotube films. When the carbon nanotube structure includes a number of carbon nanotube films, the carbon nanotube films are stacked on top of each other. The carbon nanotube structure employs more carbon nanotube films for increasing the tensile strength of the carbon nanotube structure. The carbon nanotube film has a thickness in an approximate range from about 0.5 nm to about 100 millimeters (mm). The carbon nanotube film may have a free-standing structure. The term "free-standing structure" includes, but is not limited to, a structure being supported by itself and does not need a substrate to lie on. The carbon nanotube film can be lifted by one point thereof such as a corner without sustaining damage under its own weight.

The carbon nanotube film is formed by the carbon nanotubes, orderly or disorderly, and has substantially a uniform thickness. The ordered carbon nanotube film is consisted of ordered carbon nanotubes. Ordered carbon nanotube films include films where the carbon nanotubes are arranged along a primary direction. Examples include films wherein the carbon nanotubes are arranged approximately along a same direction or have two or more sections within each of which the carbon nanotubes are arranged approximately along a same direction (different sections can have different directions).

Drawn Carbon Nanotube Film

Figure 2:
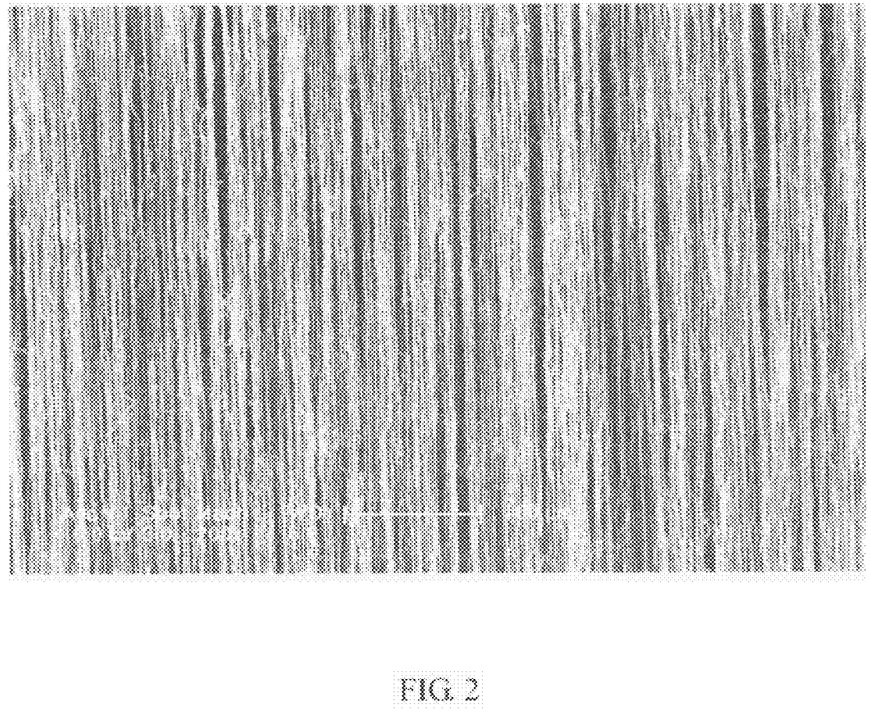
FIG. 2 is a scanning electron microscope (SEM) image of a drawn carbon nanotube film.

Referring to FIG. 2, in the drawn carbon nanotube film, the carbon nanotubes are oriented along a same preferred orientation and approximately parallel to each other. In this connection, the term "approximately" as used herein means that it is impossible and unnecessary that each of carbon nanotubes in the carbon nanotube films are parallel to one another, namely that the carbon nanotubes are parallel to each other, because in the course of fabricating the carbon nanotube film, some factor, such as the change of drawing speed, non-uniform drawing force on the carbon nanotube film when the carbon nanotube film is drawn from a carbon nanotube array. A film can be drawn from a carbon nanotube array, to form the ordered carbon nanotube film, namely a drawn carbon nanotube film. Examples of drawn carbon nanotube film are taught by U.S. Pat. No. 7,045,108 to Jiang et al. The drawn carbon nanotube film includes a plurality of successive and oriented carbon nanotubes joined end-to-end by van der Waals attractive force therebetween. The drawn carbon nanotube film is a free-standing film. The carbon nanotube film can be treated with an organic solvent to increase the mechanical strength and toughness of the carbon nanotube film and reduce the coefficient of friction of the carbon nanotube film. A thickness of the carbon nanotube film can range from about 0.5 nm to about 100 μm.

A method of making a drawn carbon nanotube film includes the steps of: providing an array of carbon nanotubes; and pulling out a drawn carbon nanotube film from the array of carbon nanotubes. Pulling can be aided by the use of a tool such as adhesive tape, pliers, tweezers, or other tools allowing multiple carbon nanotubes to be gripped and pulled simultaneously. The drawn carbon nanotube film can be formed by the substeps of: selecting one or more carbon nanotubes having a predetermined width from the array of carbon nanotubes; and pulling the carbon nanotubes at a uniform speed to form carbon nanotube segments that are joined end to end to achieve a uniform drawn carbon nanotube film.

The carbon nanotube segments can be selected by using the tool allowing multiple carbon nanotubes to be gripped and pulled simultaneously to contact with the array of carbon nanotubes. The pulling direction can be substantially perpendicular to the growing direction of the array of carbon nanotubes.

More specifically, during the pulling process, as the initial carbon nanotube segments are drawn out, other carbon nanotube segments are also drawn out end to end due to van der Waals attractive force between ends of adjacent segments. This process of pulling produces a substantially continuous and uniform carbon nanotube film having a predetermined width can be formed. When the angle between the aligned directions of the carbon nanotubes in adjacent carbon nanotube films is larger than 0 degrees, a microporous structure is defined by the carbon nanotubes. The carbon nanotube structure in an embodiment employing these films will have a plurality of micropores. The micropores have diameters which can range from about 1 nm to about 0.5 mm. Stacking the carbon nanotube films will also add to the structural integrity of the carbon nanotube structure.

Understandably, the carbon nanotube film structure may further includes at least two stacked carbon nanotube films. Additionally, when the carbon nanotubes in the carbon nanotube film are aligned along one preferred orientation (e.g., the drawn carbon nanotube film), an angle can exist between the orientation of carbon nanotubes in adjacent films. Adjacent carbon nanotube films can be combined by only the van der Waals attractive force therebetween. The number of the layers of the carbon nanotube films is not limited as long as the carbon nanotube structure. However the thicker the carbon nanotube structure, the specific surface area will decrease. An angle between the aligned directions of the carbon nanotubes in two adjacent carbon nanotube films can range from about 0 degrees to about 90 degrees.

Pressed Carbon Nanotube Film

Figure 3:
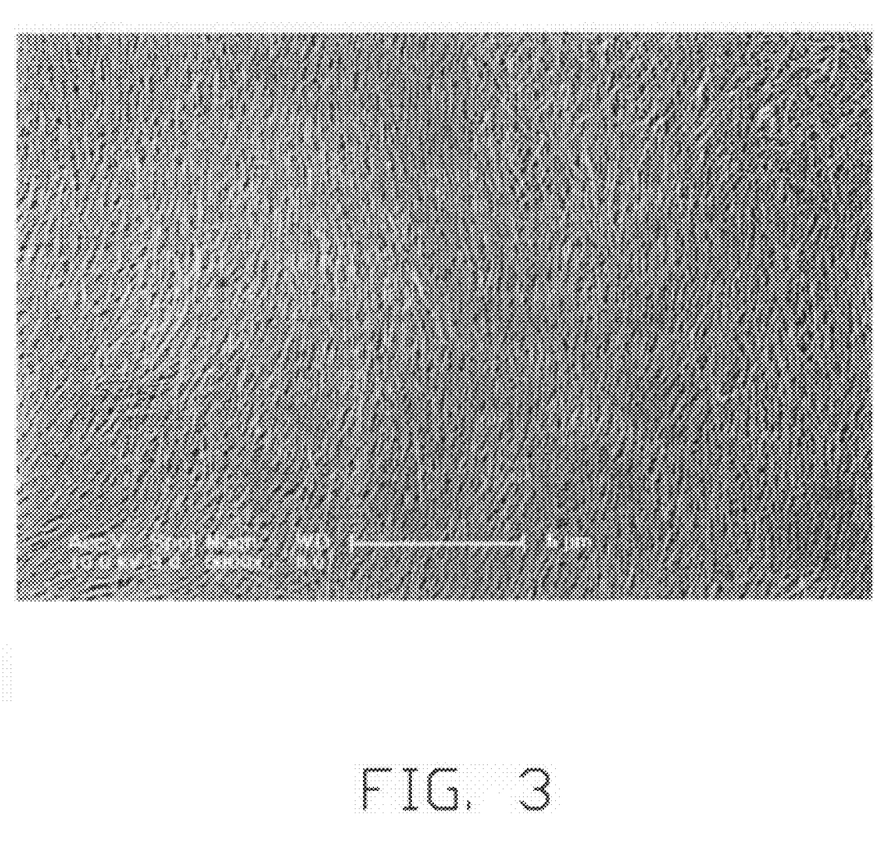
FIG. 3 is an SEM image of a pressed carbon nanotube film.

Referring to FIG. 3, the ordered carbon nanotube film may be a pressed carbon nanotube film having a number of carbon nanotubes arranged along a same direction. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is 0 degrees to approximately 15 degrees. The greater the pressure applied, the smaller the angle formed. The thickness of the pressed carbon nanotube film ranges from about 0.5 nm to about 1 mm. Examples of pressed carbon nanotube film are taught by US application 2008/0299031A1 to Liu et al. The pressed carbon nanotube film can be executed by providing an array of carbon nanotubes formed a substrate; and providing a pressing device to press the array of carbon nanotubes, thereby forming the pressed carbon nanotube film.

The pressed carbon nanotube film also may be a disordered carbon nanotube film which has a number of carbon nanotubes arranged along different directions. The pressed carbon nanotube film can be a free-standing carbon nanotube film. When the carbon nanotubes in the pressed carbon nanotube film are arranged along different directions, the pressed carbon nanotube film can be isotropic. As described above, the thickness of the pressed carbon nanotube film ranges from about 0.5 nm to about 1 mm. Examples of pressed carbon nanotube film are taught by US application 2008/0299031A1 to Liu et al.

Flocculated Carbon Nanotube Film

Figure 4:
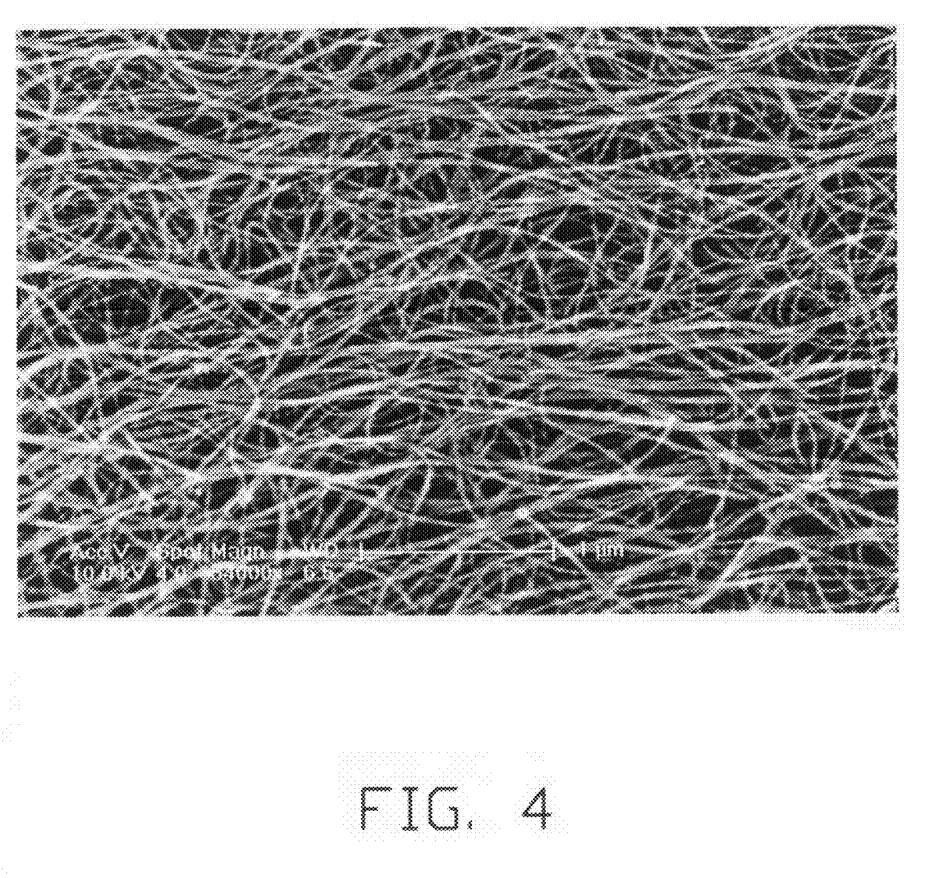
FIG. 4 is an SEM image of a flocculated carbon nanotube film.

Referring to FIG. 4, the disordered carbon nanotube film consists of the carbon nanotubes arranged disorderly. Disordered carbon nanotube films include randomly aligned carbon nanotubes. When the disordered carbon nanotube film comprises of a film wherein the number of the carbon nanotubes aligned in every direction is substantially equal, the disordered carbon nanotube film can be isotropic. The disordered carbon nanotubes can be entangled with each other and/or are substantially parallel to a surface of the disordered carbon nanotube film. The disordered carbon nanotube film may be a flocculated carbon nanotube film. The flocculated carbon nanotube film can include a plurality of long, curved, disordered carbon nanotubes entangled with each other. Further, the carbon nanotubes in the flocculated carbon nanotube film can be isotropic. The carbon nanotubes can be substantially uniformly dispersed in the flocculated carbon nanotube film. Adjacent carbon nanotubes are attracted by van der Waals attractive force to form an entangled structure with micropores defined therein. It is understood that the flocculated carbon nanotube film is porous. Sizes of the micropores can be less than 10 μm. Due to the carbon nanotubes in the flocculated carbon nanotube film being entangled with each other, the carbon nanotube structure employing the flocculated carbon nanotube film has excellent durability, and can be fashioned into desired shapes with a low risk to the integrity of the flocculated carbon nanotube film. The thickness of the flocculated carbon nanotube film can range from about 0.5 nm to about 1 mm. The flocculated carbon nanotube film can be executed by providing carbon nanotubes; flocculating the carbon nanotubes in a solvent to acquire a flocculated carbon nanotube structure; separating the flocculated carbon nanotube structure from the solvent; and shaping the separated flocculated carbon nanotube structure into the flocculated carbon nanotube film in which the carbon nanotubes are entangled with each other and isotropic.

A length and a width of the flocculated carbon nanotube film can be arbitrarily set as desired. A thickness of the flocculated carbon nanotube film can be in a range from about 0.5 nm to about 100 mm. The carbon nanotubes in the flocculated carbon nanotube film can be single-walled, double-walled, multi-walled carbon nanotubes, and combinations thereof Diameters of the single-walled carbon nanotubes, the double-walled carbon nanotubes, and the multi-walled carbon nanotubes can, respectively, be in the approximate range from about 0.5 nm to about 50 nm, about 1 nm to about 50 nm, and about 1.5 nm to about 50 nm.

Carbon Nanotube Wire

The carbon nanotube structure may be constructed one or more carbon nanotube wires. The carbon nanotube wires may be arranged side by side or may be weaved into a carbon nanotube layer. In addition, the carbon nanotube wires can also be crossed or braided into a net. The carbon nanotube wire, which is named an untwisted carbon nanotube wire, includes a number of carbon nanotubes parallel to each other. Understandably, the carbon nanotube wire, which is named a twisted carbon nanotube wire, includes a number of carbon nanotube helically twisted along a longitudinal axis of the twist carbon nanotube wire.

Figure 5:
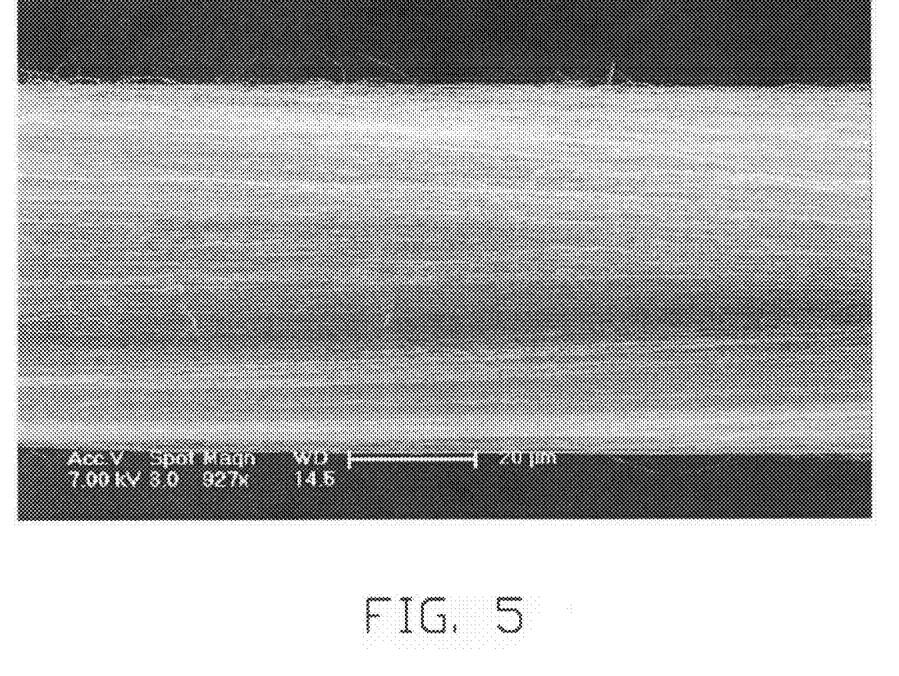
FIG. 5 is an SEM image of an untwisted carbon nanotube wire.

Referring to FIG. 5, the untwisted carbon nanotube wire can be formed by treating the drawn carbon nanotube film with an organic solvent. Specifically, the drawn carbon nanotube film is treated by applying the organic solvent to the carbon nanotube film to soak the surface of the drawn carbon nanotube film without being adhered on a substrate. After being soaked by the organic solvent, the adjacent paralleled carbon nanotubes in the drawn carbon nanotube film will bundle together, due to the surface tension of the organic solvent when the organic solvent volatilizing, and thus, the drawn carbon nanotube film will be shrunk into untwisted carbon nanotube wire. Understandably, carbon nanotubes of the untwisted carbon nanotube wires are parallel to each other along the longitudinal axis of the untwisted carbon nanotube wires. Examples of the untwisted carbon nanotube wire are taught by U.S. Pat. No. 7,045,108 to Jiang et al. and US publication No. 2007/0166223 to Fan et al.

Figure 6:
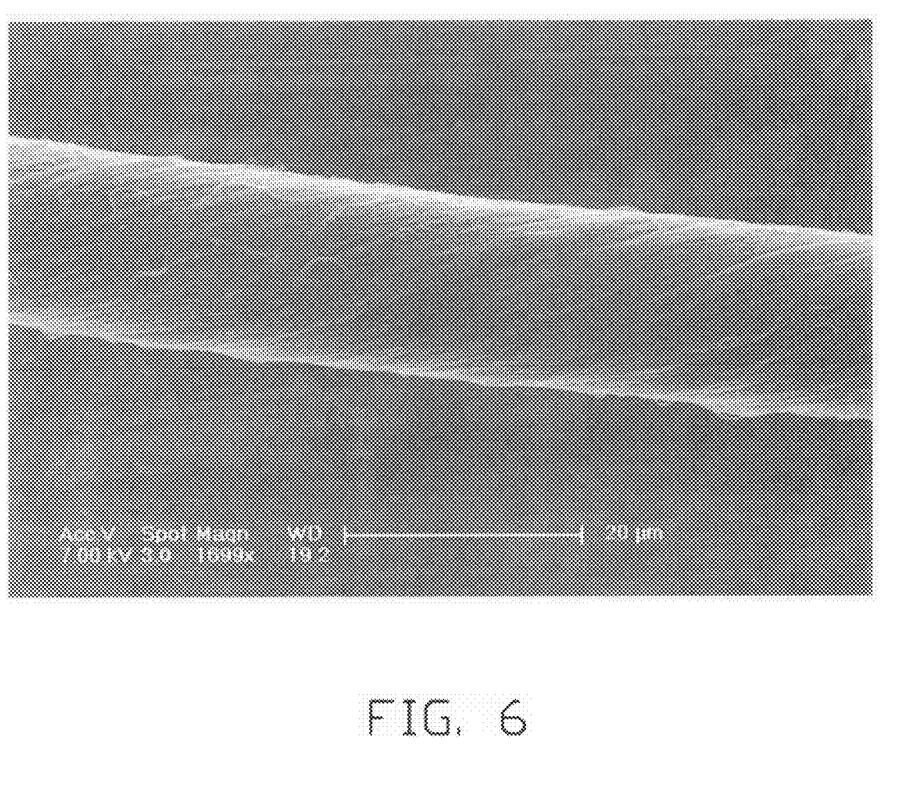
FIG. 6 is an SEM image of a twisted carbon nanotube wire.

Referring to FIG. 6, the twisted carbon nanotube wire can be formed by twisting a drawn carbon nanotube film by using a mechanical force to turn the two ends of the drawn carbon nanotube film in opposite directions. Further, the twisted carbon nanotube wire is treated by applying the organic solvent. After being soaked by the organic solvent, the adjacent paralleled carbon nanotubes in the twisted carbon nanotube film will bundle together, due to the surface tension of the organic solvent when the organic solvent volatilizing, and thus, the twisted carbon nanotube wire may have less specific surface area, and larger density and strength.

In one embodiment, a drawn carbon nanotube film functions as the heater 16. There is no particular restriction on the layer thickness, length, width of the heater 16 and it may be appropriately selected depending on the purpose. In one embodiment, the heater 16 has a length of about 1 centimeter (cm) to about 10 cm and a width of about 0.01 cm to about 10 cm and a thickness of about 0.5 nm to about 50 nm. The drawn carbon nanotube film has the heat capacity per unit area of less than or equal to about $1.7 \times 10^{-6}$ J/cm$^2$·K. Thus, the heater 16 can raise the temperature from room temperature to about 1500 Kelvins in about 1.25 milliseconds.

The at least two electrodes 18 are electrically coupled to the heater 16. The electrodes 18 are made of conductive materials and can be of any shape. The electrodes can be a conductive film, metal chip, metal wire, or the like. In one embodiment, the electrodes 18 are layers of conductive films and have diameters of about 0.5 nm to about 100 μm. The conductive films may be made of metal, alloy, indium tin oxide (ITO), antimony tin oxide (ATO), zinc aluminium oxide (ZAO), conductive silver paste, conductive polymer, carbon nanotubes, or the like. The metal or alloy may be aluminum, copper, tungsten, molybdenum, gold, titanium, silver, neodymium, palladium, cesium, or their combinations. In one embodiment, the at least two electrodes 18 are made of palladium and have thicknesses of 5 nm. Due to good wettability effect between the palladium and the carbon nanotubes of the carbon nanotube structure, good electrical contact may be formed between the at least two electrodes 18 and the heater 16 so as to decrease ohm contact resistance. In addition, since the carbon nanotube structure has large surface area and good adhesive ability by itself, good electrical contact can also be formed between the heater 16 and the at least two electrodes 18 without the use of an adhesive. Understandably, conductive paste, such as silver paste, can be employed to further fix the at least two electrodes 18 on the surface of the heater 16.

In another embodiment, the thermochromic component 10 includes a transparent layer. The transparent layer is placed on the thermochromic module 14, and the thermochromic module 14 is located between the transparent layer and the heater 16. A user can see the thermochromic module 14 through the transparent layer. The transparent layer has good heat resistance, and will not be affected with temperatures of the thermochromic module 14. A material of the transparent layer is transparent material, such as glass, polyethylene, polyvinyl chloride, or the like.

In use of the thermochromic component 10, a voltage is applied to the at least two electrodes 18, and the heater 16 will generate heat which can heat the thermochromic module 14. With changes in the voltage, the thermochromic module 14 changes color. Since the carbon nanotube structure has a low heat capacity per unit area, the heater 16 made of the carbon nanotube structure is quick temperature response and good thermal exchange with the thermochromic module 14. In one embodiment, and the heater 16 directly transfers heat to the thermochromic module 14. Thus, the heater 16 will have less thermal hysteresis than conventional material and lose less heat, thereby improving the response of the thermochromic module 14 and decreasing power cost. When the carbon nanotube structure is a drawn carbon nanotube film which directly acts as the heater 16, the drawn carbon nanotube film has a large size, and it can transfer substantially even heat to the thermochromic module 14, thus the color of the thermochromic module 14 is comparatively uniformity can have an even heat absorption, thereby improving the visual definition of the thermochromic component 10.

Figure 7:
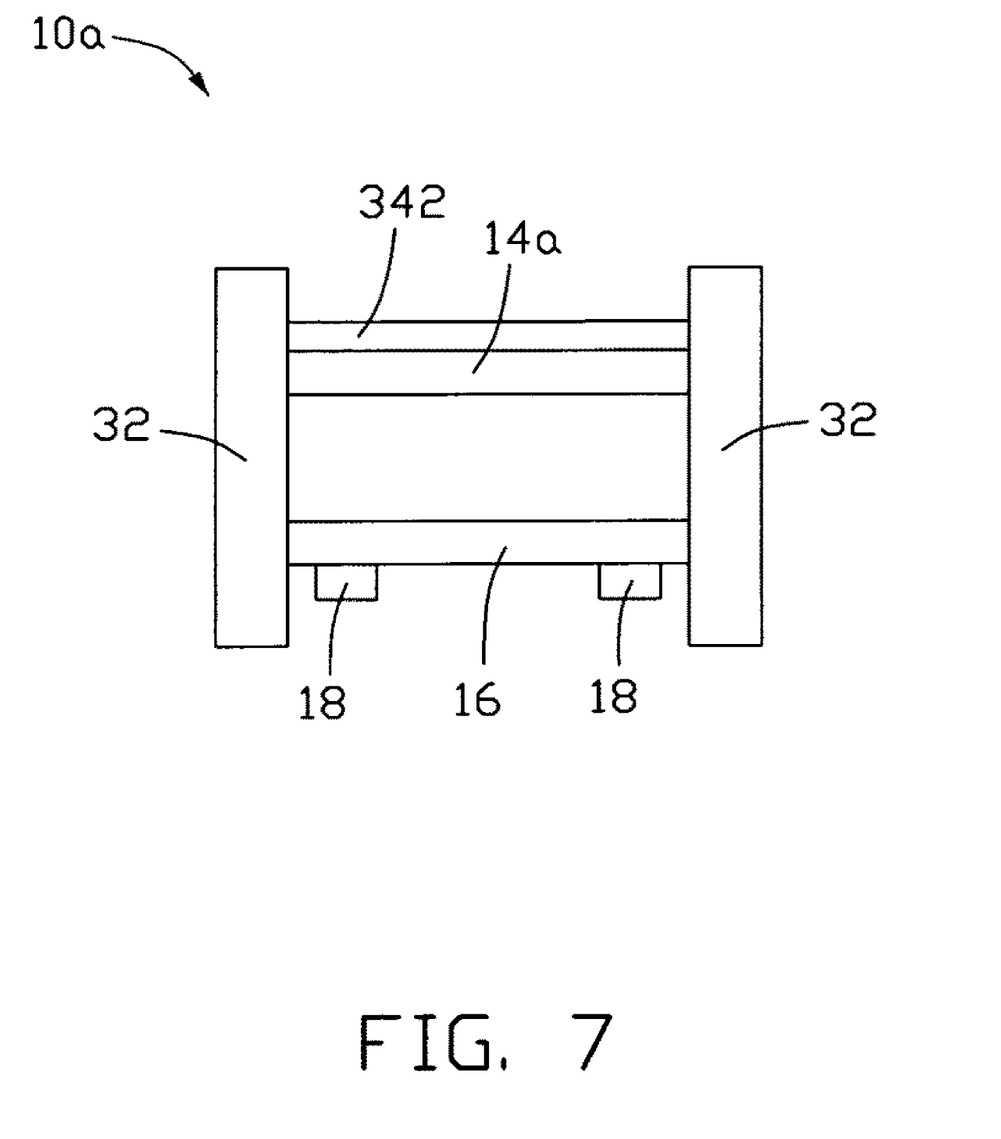
FIG. 7 is a schematic view of a thermochromic component in accordance with one embodiment.

Referring to FIG. 7, one embodiment of a thermochromic component 10a is shown. The thermochromic component 10a is substantially similar to the thermochromic component 10 except that the thermochromic module 14a is spaced apart from the heater 16a. The heater 16a directly faces the thermochromic module 14a. The thermochromic component 10a further includes a supporter 342. The supporter 342 can be transparent. The thermochromic module 14a is disposed on the surface of the supporter 342. In one embodiment, the thermochromic component 10a further includes two fixers 32, the fixers 32 can be used to fix the thermochromic module 14a and the heater 16a. The thermochromic module 14a and the heater 16a are mounted between the two fixers 32. There is no particular restriction on shape, dimension of the supporter 342 and the fixers 32 and it may be appropriately selected depending on the purpose. The supporter 342 and the fixers 32 may be made of ceramic, glass, resin, silicon dioxide, plastic, fiber, or the like. In one embodiment, the fixers 32 are made of plastic, and the supporter 342 is made of glass.

Figure 8:
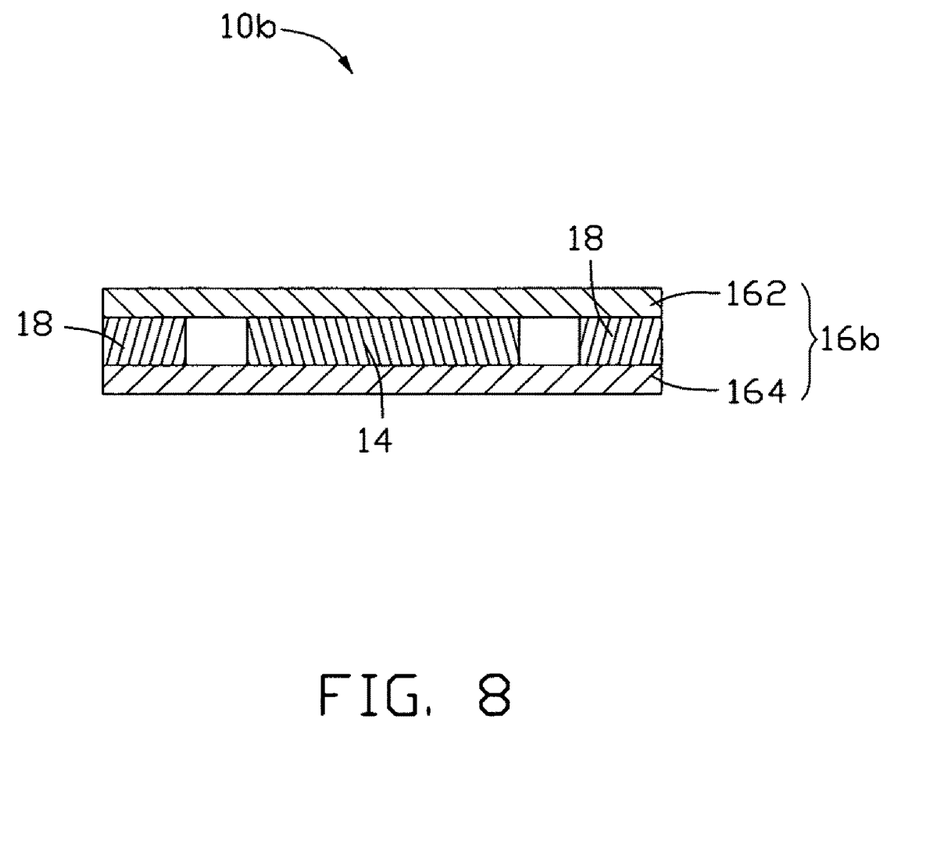
FIG. 8 is a schematic cross-sectional view of a thermochromic component in accordance with an embodiment.

Referring to FIG. 8, one embodiment of a thermochromic component 10b having a heater 16b is shown. The thermochromic component 10b is substantially similar to the thermochromic component 10. The heater 16b includes a first carbon nanotube structure 162 and a second carbon nanotube structure 164. In order to improve heat exchange speed if needed to achieve fast display response, the thermochromic module 14 is interposed between the first and second carbon nanotube structures 162, 164, and the at least two electrodes 18 are located between the first and second carbon nanotube structures 162, 164 and are coupled with the first and second carbon nanotube structures 162, 164. In one embodiment, the first and second carbon nanotube structures 162, 164 are the first and second carbon nanotube films, and the first carbon nanotube structure 162 is transparent, a user can see the thermochromic module 14 through the first carbon nanotube structure 162. Understandably, the at least two electrodes 18 can directly contact with the thermochromic module 14 or be spaced apart from the thermochromic module 14. In one embodiment, the at least two electrodes 18 are spaced apart from the thermochromic module 14 to prevent the electrodes 18 from absorbing heat of the thermochromic module 14.

Figure 9:
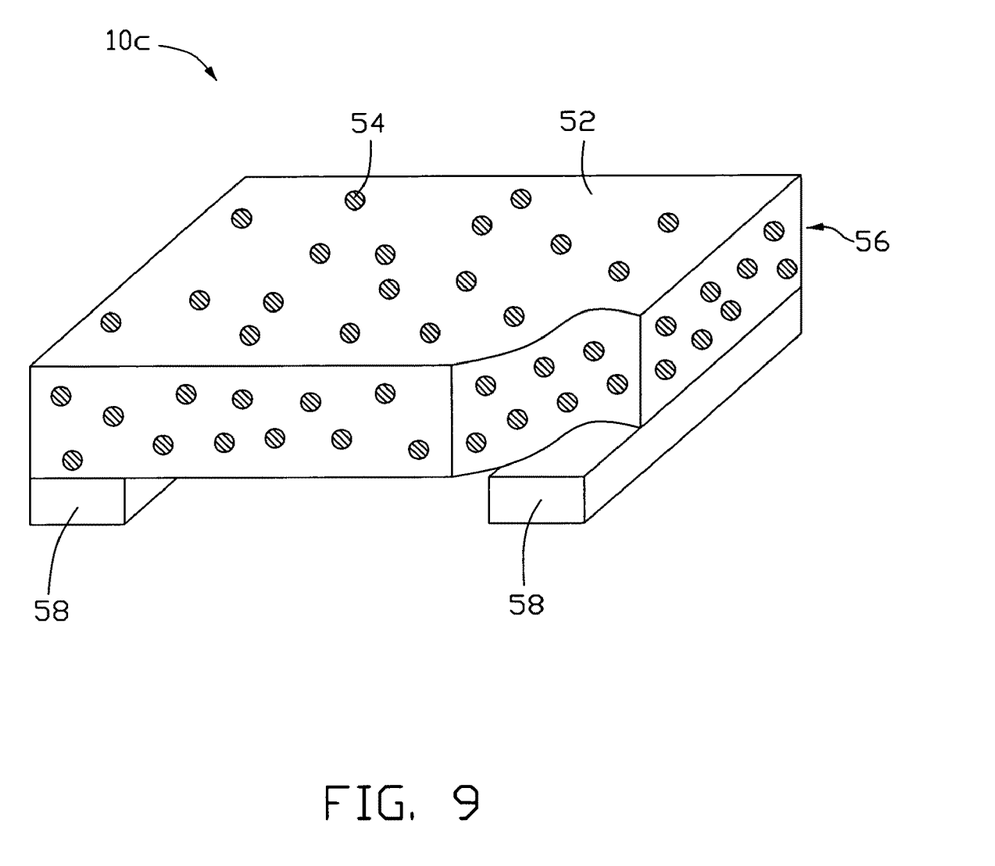
FIG. 9 is a schematic view of a thermochromic component in accordance with one embodiment.

Referring to FIG. 9, one embodiment of a thermochromic component 10c is shown. The thermochromic component 10c includes a composite material layer 56 and at least two electrodes 58. The at least two electrodes 58 are electrically connected to the composite material layer 56 and spaced apart from each other.

The composite material layer 56 includes a heater 52 and at least one thermochromic material 54 dispersed in the heater 52. The heater 52 includes at least one carbon nanotube structure as above described heaters 16, 16a, or 16b. The thermochromic material 54 can be distributed into micropores of the carbon nanotube structure to form the composite material layer 56, the micropores have diameters which can range from about 1 nm to about 0.5 mm. The composite material layer 56 can display images at the same time as heating the thermochromic material 54. This structure can provide fast heat exchange between the thermochromic material 54 and the heater 52, thereby providing faster display response of the thermochromic material 54 if needed. It can be understood that in the composite material layer 56, the at least one thermochromic material 54 can be dispersed in the heater 52 in pattern.

Figure 10:
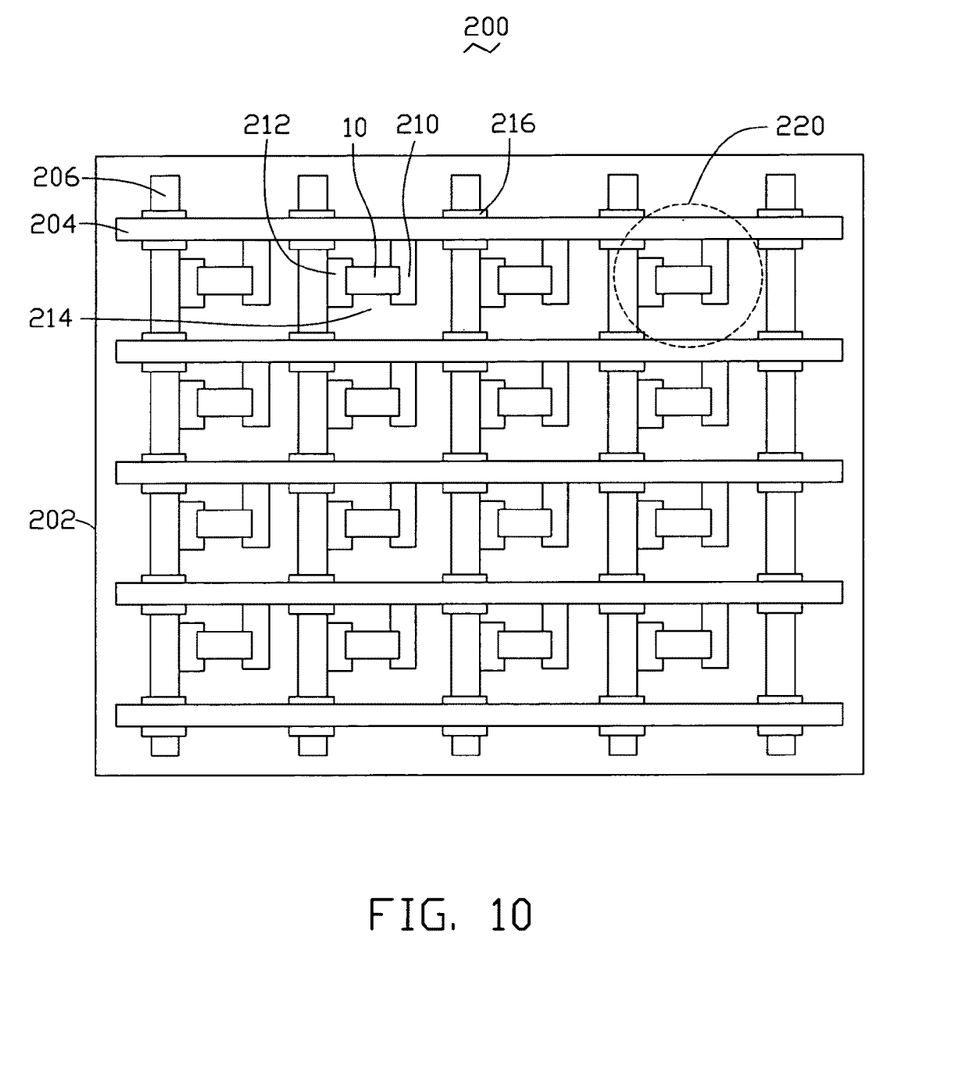
FIG. 10 is a schematic view of an embodiment thermochromic display apparatus.

Referring to FIG. 10, an embodiment of a thermochromic display apparatus 200 having the thermochromic component 10 is shown. The thermochromic display apparatus 200 includes an insulator 202, a number of thermochromic display units 220, a number of row electrodes 204, and a number of column electrodes 206. The row electrodes 204 and the column electrodes 206 are disposed on the insulator 202. The thermochromic display units 220 are disposed on the insulator 202.

The insulator 202 may be made of rigid material or flexible material. The rigid material may be ceramic, glass, resin, silicon dioxide, or the like. The flexible material may be plastic, fiber, or the like. When the insulator 202 is made of flexible material, the thermochromic display apparatus 200 can be folded into random shape in use. And, there is no particular restriction on the shape, dimension of the thermochromic display apparatus 200 and it may be appropriately selected depending on the purpose. In one embodiment, the insulator 202 is made of glass and has a thickness of about 1 mm, a length of about 3 cm, and a width of about 2 cm. In addition, the insulator 202 defines a number of cavities thereon corresponding to each thermochromic display unit 220. In packaging of the thermochromic component 10, the thermochromic component 10 can be hung above the insulator 202 to space from the insulator 202 via these cavities, thereby preventing the insulator 202 from absorbing heat of the thermochromic component 10.

The row and column electrodes 204, 206 are made of conductive material. Each of the row and column electrodes 204, 206 can have a thickness of about 10 μm to about 100 μm and a width of about 30 μm to about 1 mm. The row and column electrodes 204, 206 can be disposed on the insulator 202 via conductive slurry printing process. The conductive slurry includes metal powder, low-melting glass powder, and adhesive. The metal powder may be silver powder. The adhesive may be terpineol, ethyl cellulose, or the like. A mass percent of the metal powder in the conductive slurry ranges from about 50% to about 90%. A mass percent of the low-melting glass powder ranges from about 2% to about 10%, and a mass percent of the adhesive ranges from about 10% to about 40%.

The row electrodes 204 are parallel to and spaced apart from each other and spacing between two adjacent row electrodes 204 is set as desired. The column electrodes 206 are parallel to and spaced apart from each other and spacing between two adjacent column electrodes 207 is set as desired. The row electrodes 204 and the column electrodes 206 are crossed or braided into a net. An angle exists between the row and column electrodes 204, 206 ranges from about 10 degrees to about 90 degrees. In one embodiment, each row electrodes 204 are perpendicular to each column electrodes 206, and the row spacing is about 300 μm and the column spacing is 500 μm. Two of the adjacent row electrodes 204 and two adjacent column electrodes 206 define a grid 214 and the grid 214 corresponds to one thermochromic display unit 220. One thermochromic display unit 220 is disposed in one grid 214. The thermochromic display apparatus 200 further includes a number of insulative pads 216. Each of the insulative pads 216 is disposed one of intersection points of the row and column electrodes 204, 206. The insulative pads 216 are used to avoid short circuit between the row and column electrodes 204, 206.

Each of the thermochromic display units 220 includes one thermochromic component 10, a first electrode 210, and a second electrode 212. The first electrode 210 is electrically connected to one of the row electrodes 204. The second electrode 212 is electrically connected to one of the column electrodes 206. The first and second electrodes 210, 212 are electrically connected to the thermochromic component 10. The thermochromic component 10 is located above one of the cavities of the insulator 202 and spaced apart from the insulator 202. The first and second electrodes 210, 212 are made of conductive material and have appropriate size suitable for the size of the grid 214. The conductive material can be conductive slurry and is printed on the insulator 202 via screen printing process. In one embodiment, the first electrode 210 has a length of about 60 μm, a width of about 40 μm and a thickness of about 20 μm. The second electrode 212 has a length of about 70 μm, a width of about 40 μm and a thickness of about 20 μm. A distance between the first and second electrodes 210, 212 is set as the dimension of the thermochromic component 10. In one embodiment, the distance between the first and second electrodes 210, 212 is about 250 μm.

In manufacturing the thermochromic display apparatus 200, the electrodes 18 of the thermochromic component 10 may be electrically connected to the first and second electrodes 210, 212 via conductive paste, intermolecular force, or the like. Since the heater 16 is made of carbon nanotube structure, the carbon nanotube structure can be coated on the first and second electrodes 210, 212, which can simplify the method of making the thermochromic display apparatus 200. The thermochromic module 14 can be mounted on the heater 16, and can be located between the heater 16 and the first and second electrodes 210, 212. The heater 16 can be between the thermochromic module 14 and the first and second electrodes 210, 212. Understandably, the thermochromic modules 14 may be made of same materials or different materials. When the thermochromic modules 14 are made of different materials, the thermochromic display apparatus 200 can display a greater variety of colors. Understandably, the thermochromic component 10a, 10b, 10c can also be used in the thermochromic display apparatus 200.

In use of the thermochromic display apparatus 200, voltage is applied to the row and column electrodes 204, 206, thus, the heater 16 will generate heat which can directly be transferred to the thermochromic module 14. As the voltage applied changes, color of the thermochromic module 14 changes. The thermochromic display apparatus 200 can display different images via controlling duration of one color displayed by the thermochromic module 14, such as 0.04 seconds.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A thermochromic component, comprising:
a thermochromic module capable of changing colors under changing temperature conditions;
a heater thermally coupled with the thermochromic module and comprising a carbon nanotube structure, the carbon nanotube structure being capable of applying heat to the thermochromic module; and
two electrodes electrically connected to the heater and configured to apply a voltage to the heater.

2. The thermochromic component of claim 1, wherein the carbon nanotube structure comprises a carbon nanotube film, the carbon nanotube film comprises a plurality of carbon nanotubes combined by van der Waals force, and an angle between a primary alignment direction of each of the plurality of carbon nanotubes and a surface of the carbon nanotube film is in the range of 0 degrees to approximately 15 degrees.

3. The thermochromic component of claim 1, wherein the carbon nanotube structure comprises a single drawn carbon nanotube film, the drawn carbon nanotube film comprises a plurality of carbon nanotubes approximately parallel to each other and joined end to end by van der Waals force.

4. The thermochromic component of claim 1, wherein the carbon nanotube structure comprises two drawn carbon nanotube films, carbon nanotubes in each of the two drawn carbon nanotube films are aligned along one orientation, and an angle between the orientation of carbon nanotubes in the two drawn carbon nanotube films ranges from about 0 degrees to about 90 degrees.

5. The thermochromic component of claim 1, wherein the carbon nanotube structure comprises a carbon nanotube film, the carbon nanotube film comprises a plurality of carbon nanotubes that are entangled with one another.

6. The thermochromic component of claim 1, wherein the carbon nanotube structure comprises a plurality of carbon nanotube wires, the plurality of carbon nanotube wires are arranged side by side to form a carbon nanotube layer.

7. The thermochromic component of claim 1, wherein the carbon nanotube structure comprises a plurality of carbon nanotube wires, and the plurality of carbon nanotube wires forms a weaved structure or a net structure.

8. The thermochromic component of claim 1, wherein the thermochromic module is disposed on the heater.

9. The thermochromic component of claim 1, wherein the thermochromic module is spaced apart from the heater.

10. The thermochromic component of claim 9, further comprising a supporter, wherein the thermochromic module is disposed on the supporter.

11. The thermochromic component of claim 1, wherein the heater comprises a first carbon nanotube structure and a second carbon nanotube structure, the thermochromic module is located between the first and second carbon nanotube structures, the first and second carbon nanotube structures are capable of applying heat to the thermochromic module.

12. The thermochromic component of claim 1, wherein the carbon nanotube structure defines a plurality of micropores, and the thermochromic module comprises of one or more thermochromic materials distributed in one or more of the plurality of micropores.

13. The thermochromic component of claim 1, wherein materials of the thermochromic module are single-colored thermochromic materials or multi-colored thermochromic materials.

14. The thermochromic component of claim 1, wherein the thermochromic module is made of a thermochromic liquid crystal material.

15. A thermochromic component, comprising:
a thermochromic module;
a heater being adjacent to the thermochromic module, the heater having a sheet-shaped configuration and consisting of at least one layer of carbon nanotube film, the at least one layer of carbon nanotube film being capable of applying heat to the thermochromic module; and
two electrodes electrically connected to the heater and configured to apply a voltage to the heater.

16. The thermochromic component of claim 15, wherein the heater comprises a carbon nanotube film, and the carbon nanotube film comprises a plurality of carbon nanotubes joined end to end by van der Waals force.

17. The thermochromic component of claim 16, wherein the carbon nanotube film has a heat capacity per unit area of less than or equal to $1.7 \times 10^{-6}$ J/cm$^2$·K.

18. A thermochromic display apparatus, comprising:
an insulator;

a plurality of row electrodes and a plurality of column electrodes disposed on the insulator, and two adjacent row electrodes and two adjacent column electrodes defining a grid; and a plurality of thermochromic display units, each of the thermochromic display units mounted in one corresponding grid, each of the thermochromic display units comprising a thermochromic component; the thermochromic component comprising a thermochromic module, a heater thermally coupled with the thermochromic module, a first electrode, and a second electrode, the thermochromic module being capable of changing colors under changing temperature conditions, the heater comprising a carbon nanotube structure capable of applying heat to the thermochromic module; wherein the first electrode is electrically connected to one of the row electrodes, the second electrode is electrically connected to one of column electrodes.

19. The thermochromic display apparatus of claim 18, further comprising a plurality of insulative pads, each of the insulative pads is disposed one of intersection points of the row and column electrodes.

20. The thermochromic display apparatus, of claim 18, wherein the carbon nanotube structure is a carbon nanotube film, and the carbon nanotube film comprises a plurality of carbon nanotubes joined end to end by van der Waals force.

* * * * *